(No Model.)
J. N. WOLFE.
Corn Sheller.
No. 239,689.  Patented April 5, 1881.
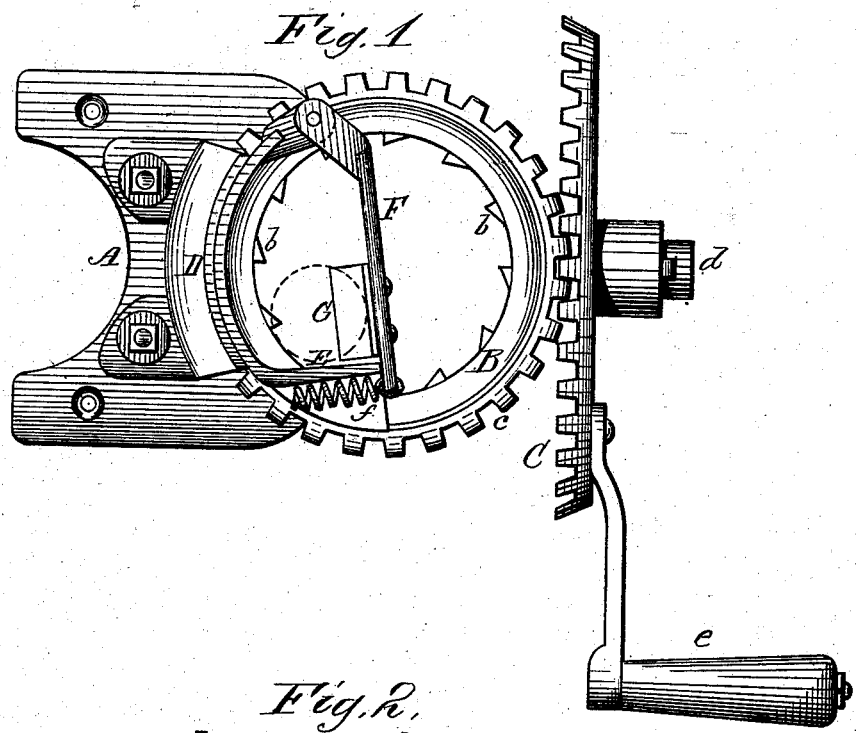
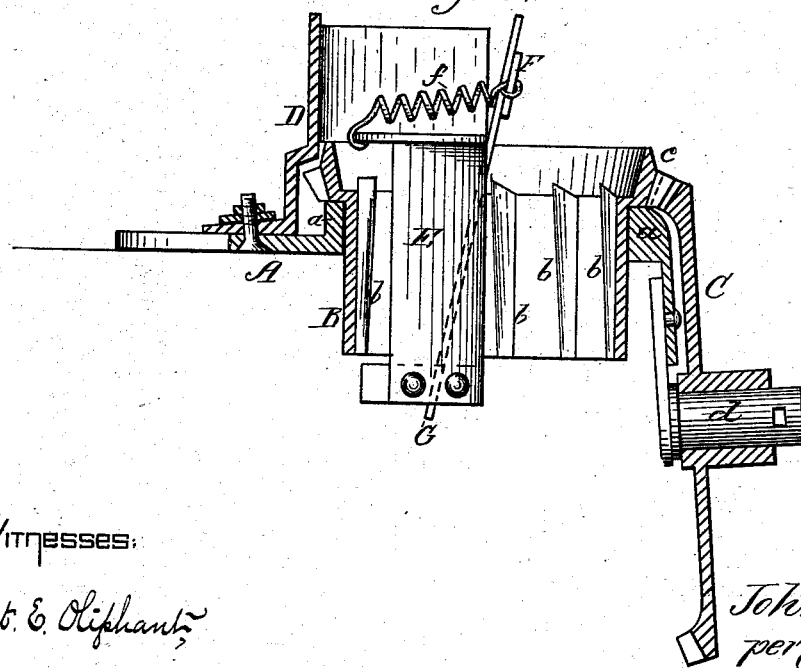
Witnesses:
Nat. E. Oliphant
Geo. R. Porter
Inventor:
John N. Wolfe,
per Chas. H. Fowler,
Attorney.

UNITED STATES PATENT OFFICE.

JOHN N. WOLFE, OF LANCASTER, OHIO.

CORN-SHELLER.

SPECIFICATION forming part of Letters Patent No. 239,689, dated April 5, 1881.

Application filed July 15, 1880. (No model.)

*To all whom it may concern:*

Be it known that I, JOHN N. WOLFE, a citizen of the United States, residing at Lancaster, in the county of Fairfield and State of Ohio, have invented certain new and useful Improvements in Corn-Shellers; and I do hereby declare that the following is a full, clear, and exact description of the same, reference being had to the annexed drawings, making a part of this specification, and to the letters and figures of reference marked thereon.

Figure 1 is a top-plan view of my invention, and Fig. 2 a side elevation, partly in section.

The present invention has relation to certain new and useful improvements in corn-shellers, and the object thereof is to provide a simple, cheap, and effective sheller, the said object being obtained by the mechanism shown in the drawings, and hereinafter described.

In the accompanying drawings, A represents a metal frame, adapted to be connected by set-screws to a table, bench, or other fixture. This frame A is formed with a horizontal hoop, $a$, for supporting a sheller-wheel, B, having upon its interior raised ribs $b$, which work against the ear of corn. The wheel B is formed with bevel-teeth $c$ upon the exterior thereof, for engaging with the teeth upon a driving-wheel, C, journaled upon a short shaft, $d$, projecting from the hoop $a$, the wheel C being operated by a suitable handle, $e$.

Secured to the frame A is a bracket, D, which projects some distance above the upper portion of the sheller-wheel B, and has an extension, E, passing down through the sheller-wheel for the ear of corn to work against while being given a whirling motion by the revolution of the wheel B.

An arm, F, is hinged to the bracket D, its opposite end having connected thereto a suitable spring, $f$, also secured to the bracket. The hinged arm F has secured to it a plate, G, continuing down into the wheel B, and at a right angle to the extension E.

The ear of corn is placed in position against the extension E and plate G, as shown in dotted lines, Fig. 1. The wheel B is now caused to revolve, which turns the ear of corn, the ribs $b$ also taking off the kernels. The hinged arm F, together with the spring $f$, adapts the space between the extension E and plate G to various-sized ears.

Having now fully described my invention, what I claim as new, and desire to secure by Letters Patent, is—

In a corn-sheller, the combination, with the horizontal revolving wheel B, having ribs $b$, bevel-teeth $c$, and the driving-wheel C, of the hinged arm F, spring $f$, plate G, and extension E, constructed and arranged to operate substantially as and for the purpose set forth.

In testimony that I claim the above I have hereunto subscribed my name in the presence of two witnesses.

JOHN N. WOLFE.

Witnesses:
WILLIAM DAVIDSON,
JAMES DAVIDSON.